United States Patent [19]

Sormunen

[11] 4,106,342
[45] Aug. 15, 1978

[54] PRESSURE MEASURING APPARATUS

[76] Inventor: Onni Söre Sormunen, Boovagen 53, 13200 Saltsjö-Boo, Sweden

[21] Appl. No.: 787,671

[22] Filed: Apr. 14, 1977

[51] Int. Cl.² ............................................. G01L 7/06
[52] U.S. Cl. ........................................ 73/386; 73/708
[58] Field of Search .................. 73/393, 385, 386, 387

[56] References Cited

U.S. PATENT DOCUMENTS

| 3,085,595 | 4/1963 | Armstrong et al. | 73/407 R |
| 3,643,510 | 2/1972 | Lissan | 73/406 |

Primary Examiner—Donald O. Woodiel
Attorney, Agent, or Firm—Beveridge, De Grandi, Kline & Lunsford

[57] ABSTRACT

There is provided a pressure measuring apparatus, useful as a barometer, comprising a first variable volume vessel containing a gas, said first vessel being extendable and retractable between a first end and a second end thereof, the pressure to be measured acting on said first vessel, a second variable volume vessel containing a substantially incompressible liquid, said second vessel being extendable and retractable between a first and a second end thereof, a means for indicating the pressure acting on said first vessel, a first member joined to said first end of said first vessel and a second member joined to said second end of said first vessel, said first end of said second vessel being joined to open of said members, said second end of said second vessel or said second vessel being joined to the other of said members, said indicating means communicating with the interior of one of said first vessel, said members being relatively movable toward and away from each other in parallel relationship, whereby a temperature induced pressure variation of said gas and a temperature induced volume variation of said liquid compensate each other.

5 Claims, 5 Drawing Figures

PRESSURE MEASURING APPARATUS

The present invention relates to a pressure indicating apparatus, useful as a barometer, and more particularly to an improved barometer for minimizing temperature induced measuring errors.

Hitherto, precision barometers have been of the aneroid type or the mercury type.

Precision aneroid barometers are relatively expensive to make. However, they are rather sturdy and readily transportable.

Mercurial barometers have a fairly good accuracy but are rather expensive to make.

Moreover, mercury requires a riser tube having a relatively large bore, and therefore a mercury barometer has a very restricted transportability.

Temperature induced variations of the length of the mercury column can be corrected by means of correction tables.

The previously known technique regarding barometers having means incorporated for compensation of such temperature induced errors is represented by the Danish Patent No. 9881, the German Patent No. 261,090, the British Patent No. 742,020 and the U.S. Pat. No. 2,276,334.

However, such known temperature compensated barometers have several drawbacks, for example
a. the use of mercury is essential; if any other liquid is substituted for the mercury, gas will dissolve in the liquid in proportion to the gas pressure,
b. the use of mercury renders the barometer substantially intransportable.

Accordingly, it is a primary object of the present invention to provide an improved precision barometer having a structurally simple and reliable temperature compensation device.

Another object is to provide a novel barometer having a compensation device which accurately compensates for temperature induced errors also when atmospheric pressure deviates from the normal pressure.

Another object is to provide a novel precision barometer structure which can be manufactured at low costs.

Another object is to provide a barometer which can stand a fairly rough handling and thus be readily transportable.

Another object is to provide a barometer wherein an organic liquid can be substituted for mercury without detrimental effects.

Other objects of the invention will be clear from the following description of an inventive barometer.

The above mentioned drawbacks pertaining to known temperature compensated barometers are avoided and the above mentioned objects are fulfilled by the inventive pressure measuring apparatus, which can be said to be of the "gas" type in contrast to aneroid-type and mercurial-type barometers.

The improved inventive pressure measuring apparatus, which is useful as a barometer is characterized by comprising a first variable volume vessel containing a gas, said first vessel being extendable and retractable between a first end and a second end thereof, the pressure to be indicated acting on said first vessel, a second variable volume vessel containing a substantially incompressible liquid, said second vessel being extendable and retractable between a first and a second end thereof, a means for indicating the pressure acting on said first vessel, a first member joined to said first end of said first vessel and a second member joined to said second end of said first vessel, said first end of said second vessel being joined to one of said members, said second end of said second vessel being joined to the other of said members, said indicating means communicating with the interior of one of said first vessel and said second vessel, said members being relatively movable toward and away from each other in parallel relationship, whereby a temperature induced pressure variation of said gas and a temperature induced volume variation of said liquid compensate each other.

Preferably said first and second vessels are constituted by bellows, of which one suitably is arranged within the other, said bellows preferably having common end walls and preferably being concentrically arranged.

Generally, said first and second vessels are arranged to extend and retract in concert when the temperature varies and thus the volume of the second vessel varies, thereby to compensate for the pressure variations and/or the volume variations of the gas in the first vessel due to changes in ambient temperature.

In the embodiment where the indicating means (known per se) communicates with the gas vessel (and the liquid vessel is completely sealed), the gas pressure will, for a constant atmospheric pressure, remain substantially constant despite varying ambient temperatures.

Thus, the gas pressure will be a constant reference pressure, to which one side of the indicating means is connected.

The indicating means may consist of a narrow, preferably horizontal type (capillary tube) containing a droplet of a suitable liquid. The position of the droplet along the tube is an indication of atmospheric pressure.

In the embodiment where the indicating means comprises a riser tube preferably of a transparent material which tube communicates with the liquid, the liquid will rise in the tube in response to atmospheric pressure, whereby the level of the liquid column is a true indication of the prevailing atmospheric pressure, thanks to the temperature compensating interaction between said first and said second vessel. The riser tube may be very narrow (e.g. a capillary tube) and the liquid need not be mercury but can advantageously be some mineral oil, or the like, having a low vapour pressure. The tube may communicate with the atmosphere, for example via a narrow aperture. There is, thus, no risk that the liquid shall leave the tube even if the barometer is turned upside down.

If mercury or some other electrically conducting liquid is utilized, the liquid may "short circuit" a resistance wire which extends through the tube such that the resistance of the combination of wire and mercury is a function of the indicated atmospheric pressure. By passing a predetermined electric current through said wire, the output signal current will be a measure of the pressure sensed by the barometer. This output signal may be transmitted by radio to a receiving station, for example a weather bureau or the like, or recorded on some type of tape recorder or the like.

As the gas has a "rectilinear" temperature expansion, while the liquid has a "curvilinear" temperature expansion, the position of the droplet or the top of the liquid column can be read against a movable correction scale. Such a correction scale, having curved scale lines, is displaced relative to the glass gauge response to ambient temperature. To displace the scale a bellows can be utilized, containing a fluid which expands and retracts in response to ambient temperature.

The accompanying drawing which is incorporated in and constitutes a part of the specification illustrates schematically two preferred embodiments of the invention, and together with the description serve to explain the principles of the invention.

Figure 1:
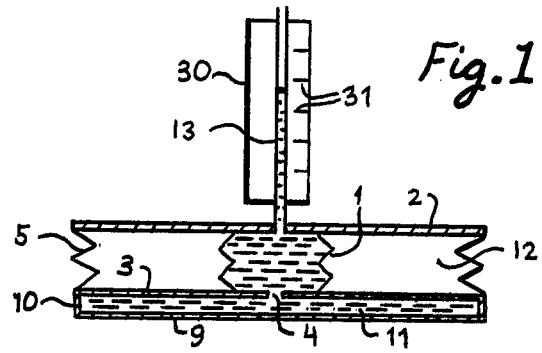
FIG. 1 is a schematic partly sectioned side view of a first embodiment of a barometer constructed in accordance with the present invention.

As shown in FIG. 1 the barometer comprises a relatively wide circular bellows 5 and a more narrow circular bellows 1 concentric therewith. An upper stiff end plate 2 is sealingly joined to the top edges of both the bellows 5 and 1, and a lower stiff end plate 3 is sealingly joined to the bottom edges of both the bellows 5 and 1.

The lower plate 3 has an aperture 4. A reservoir defined by the plate a circular wall 10 and a bottom wall 9 communicates via the aperture 4 with the interior of the bellows 1.

An aperture is also provided in the upper plate 2, and a riser tube 13 fitted on the upper plate 2 communicates, via said aperture, with the interior of the bellows 1.

Said reservoir and said bellow 1 are completely filled with a liquid 11 such as a mineral oil, and liquid will move to different levels in the tube 13 which may consist of glass, in response to atmospheric pressure acting on the plates 2 and 3.

The sealed space between the bellows 5 and 1 contains a gas 12 such as nitrogen.

The gas has preferably an absolute pressure of around one atmosphere.

The end face of the bellows 5 is preferably several times as large as the end face of the bellows 1 in order to multiply the forces acting to compress the bellows 1.

If ambient temperature rises, the gas pressure increases and the gas tends to separate the plates 2 and 3.

Thus, if the plate 2 is stationary, the plate 3 will move downwards, which means that the liquid level in the tube 13 will sink a corresponding distance.

However, the liquid will expand also when its temperature rises, and such a liquid expansion leads to the result that the liquid level in the tube 13 will rise.

These two temperature induced expansions are adapted to eliminate each other.

The volume of said reservoir is adapted so that the total liquid volume in combination with the coefficient of thermal expansion of the liquid will provide a liquid level variation in the tube, corresponding to the liquid level movement in the tube depending on the distance variation between plates 2 and 3.

The liquid level is read against the scale lines 31 of the scale 30 which is stationary relative to the plate 2.

Figure 2:
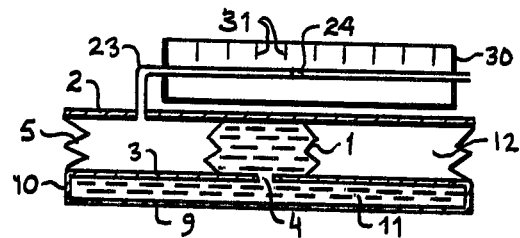
FIG. 2 is a schematic, partly sectioned side view of a second embodiment of a barometer constructed in accordance with the present invention.

In FIG. 2 there is shown a barometer similar to the one according to FIG. 1 with the exception that the riser tube 13 and the aperture in the upper end wall of bellows 1 are omitted.

Instead, there is provided an aperture in the plate 2 in the gas filled area of the bellows 5.

A tube 23 is connected to the aperture 8. The tube 23 is very narrow and extends substantially horizontally. A droplet 24 of a suitable liquid seals the tube 23. The droplet 24 will move along the tube 23 as atmospheric pressure varies, and the position of said droplet 24 along the tube 24 is an indication on the prevailing atmospheric pressure.

Figure 3:
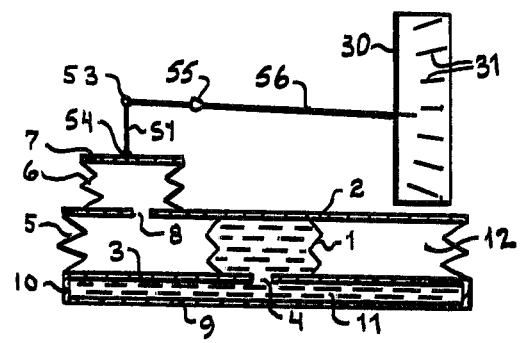
FIG. 3 shows a variant of the barometer according to FIG. 2.

The barometer according to FIG. 3 corresponds to the one according to FIG. 2, except that the tube 23 is replaced by a conventional bellows device.

This bellows device comprises an aperture 8 in the upper end wall of the gas bellows 5, a relatively soft bellow 6 having a stiff upper wall 7.

A hand 55, indicating on the scale 30, is pivoted at 56, and is coupled to the end wall 7 via the pivot 53, the link 51 and the pivot 54.

Figure 4:
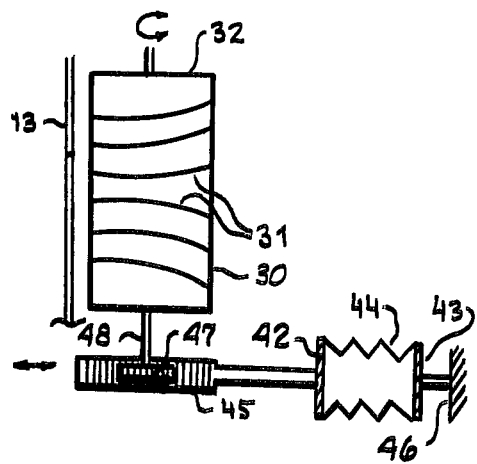
FIG. 4 illustrates a movable correction scale for the indicating means of the barometers according to FIGS. 2 and 3.

In FIG. 4 there is shown a rotatable cylinder 32, the shaft 48 of which carries a gear 47. Gear 47 meshes with a tooth rack 45 which is coupled to a bellows 42, 43, 44, which in turn is connected to a member 46 which is stationary relative to the tube 13 (or 23).

The cylinder 32 is provided with a scale 30 having scale lines 31, which compensate for the different heat expansion curves of the liquid and the gas, respectively.

As ambient temperature varies, the fluid inside bellows 44 will expand or retract to reciprocate the rack 45 and present a corrected array of scale lines at the tube 13 (or 23).

The curvatures of lines 31 may be established empirically.

Figure 5:
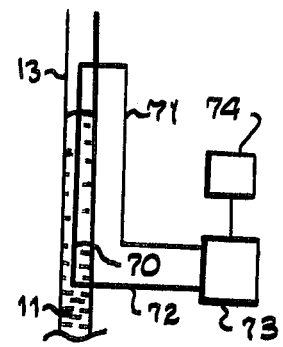
FIG. 5 illustrates a means for translating the pressure indication of the barometer according to FIG. 1 into an electric signal.

In FIG. 5 there is shown the riser tube 13 (c.f. FIG. 1) containing an electrically conducting fluid 11. A naked resistance wire 70 extends through the interior of tube 13. The resistance of the wire 70 is sensed by a resistance meter 73, which by leads 71 and 72 is connected to the ends of wire 70.

The meter 73 senses the combined resistance of the liquid 11 and the wire 70, which is "short-circuited" by the liquid.

Thus, the sensed resistance is an indication of the level of the liquid 11 in the tube 13.

The sensed resistance signal may be recorded on a tape recorder or transmitted via a radio transmitter 74.

Numerous variations of the described apparatus are possible within the scope of the enclosed claims, as is appreciated by those skilled in the art.

What is claimed is:

1. A pressure measuring apparatus, useful as a barometer, comprising a first variable volume vessel containing a gas, said first vessel being extendable and retractable between a first end and a second end thereof, the pressure to be measured acting on said first vessel a second variable volume vessel containing a substantially incompressible liquid, said second vessel being extendable and retractable between a first end and a second end thereof, a riser tube communicating with the interior of said second vessel for indicating the pressure acting on said first vessel, a first member joined to said first end of said first vessel and a second member joined to said second end of said first vessel, said first end of said second vessel being joined to one of said members, said second end of said second vessel being joined to the other of said members, said members being relatively movable toward and away from each other in parallel relationship whereby a temperature induced pressure variation of said gas and a temperature induced volume variation of said liquid compensate each other.

2. An apparatus as set forth in claim 1 further comprising a scale having scale lines, which are corrected for the deviation between the heat expansion characteristics of said gas and said liquid, said scale being movable transverse to said riser tube and being driven by the heat expansion and retraction of a fluid.

3. An apparatus as set forth in claim 1 further comprising means for sensing the position of the top of the liquid column in said tube, said sensing means being arranged to emit a signal in response to said position, and a means for recording said signal.

4. A pressure measuring apparatus, useful as a barometer, comprising a first variable volume vessel containing a gas, said first vessel being extendable and retractable between a first end and a second end thereof, the pressure to be measured acting on said first vessel a second variable volume vessel containing a substantially incompressible liquid, said second vessel being extendable and retractable between a first end and a second end thereof, a substantially horizontal, narrow, open ended tube containing a liquid droplet and communicating with the interior of said first vessel for indicating the pressure acting on said first vessel, a first member joined to said first end of said first vessel and a second member joined to said second end of said first vessel, said first end of said second vessel being joined to one of said members, said second end of said second vessel being joined to the other of said members, said members being relatively movable toward and away from each other in parallel relationship;

whereby a temperature induced pressure variation of said gas and a temperature induced volume variation of said liquid compensate each other.

5. An apparatus as set forth in claim 4 further comprising a scale having scale lines, which are corrected for the deviation between the heat expansion characteristics of said gas and being driven by the heat expansion and retraction of a fluid.

* * * * *